Figure 2:
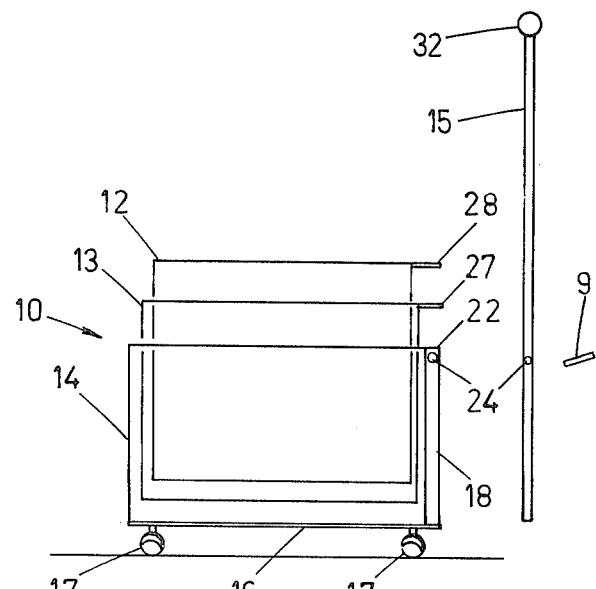

United States Patent [19]
Barrett

[11] 4,248,442
[45] Feb. 3, 1981

[54] LAUNDRY CART WITH A PLURALITY OF NESTING HAMPERS

[76] Inventor: Anne Barrett, 5 Vicora Linkway, Don Mills, Ontario, Canada, M3C 1A5

[21] Appl. No.: 38,584

[22] Filed: May 14, 1979

[51] Int. Cl.³ .......................... B62B 3/02; B62B 5/06
[52] U.S. Cl. .............................. 280/33.99 T; 206/505; 280/47.37 R
[58] Field of Search ................ 280/33.99 T, 33.99 R, 280/47.37 R, 47.37 C, DIG. 3, DIG. 4, 79.1 R, 79.1 A, 79.2, 79.3, 47.23, 47.18, 47.19; 206/505, 507, 515, 519; 211/188, 194, 59.1, 85, 133; 186/40, 45, 59, 62–66

[56] References Cited

U.S. PATENT DOCUMENTS

| | | | |
|---|---|---|---|
| 2,319,589 | 5/1943 | Drinkwater | 280/47.35 |
| 2,531,520 | 11/1950 | Lankford, Jr. | 280/47.19 |
| 2,578,409 | 12/1951 | Evans et al. | 280/47.19 |
| 2,819,938 | 1/1958 | Zerver | 280/79.3 |
| 3,376,046 | 4/1968 | Kivett et al. | 280/33.99 T |
| 3,398,840 | 8/1968 | Wilson | 206/505 |
| 3,409,163 | 11/1968 | Lockwood | 206/505 |
| 3,726,535 | 4/1973 | Longato | 280/79.2 |

FOREIGN PATENT DOCUMENTS 2400398  7/1975  Fed. Rep. of Germany .......... 280/79.3

*Primary Examiner*—David M. Mitchell
*Attorney, Agent, or Firm*—K. Maxwell Hill

[57] ABSTRACT

A laundry cart for use by an inhabitant of a high rise apartment dwelling served by passenger elevators comprising a plurality of nesting hampers having a lower hamper moveable in a horizontal plane by wheels or casters fixed to a bottom of said lower hamper. The cart is manipulated by a vertical pole-handle removeably situate in a socket means attached to the outside of a vertical end wall of one of the hampers. The upper hampers have clamps fixed to their top edges for clasping the pole and thereby preventing the loaded hamper from overbalancing when the cart is moved.

2 Claims, 2 Drawing Figures

U.S. Patent      Feb. 3, 1981      4,248,442

LAUNDRY CART WITH A PLURALITY OF NESTING HAMPERS

FIELD OF INVENTION

The present invention relates to a laundry cart for use by an inhabitant of a high-rise dwelling where the cart and laundry therein is to be pushed on and off elevators and down hallways. In particular the invention herein provides a laundry hamper with wheels mounted for movement across hallways and carpeted floors and has a vertically disposed handle for manipulating the hamper-cart into confined spaces such as closets and elevators without the necessity of the person pushing the cart to stoop to manipulate it. The pole-handle of the cart is adapted to receive a plurality of additional hampers which interfit and nest in the wheeled hamper to allow for a vertical stack of laundry to be carted about the high-rise dwelling. The handle, wheeled hamper and the nesting hampers are all dismantable to allow for easy storage in a closet or the trunk of an automobile.

PRIOR ART METHODS AND DISADVANTAGES THEREOF

It is known that inhabitants of multiple storey dwellings rely on stairs and elevators for transporting their goods such as laundry, from the ground floor entrances to their apartments and it is known to be difficult to manipulate dollies and other wheeled vehicles into the elevators because of their small space in most high-rise buildings. It is also known that the drag-type handles used on carts and wagons will interfere with the use of an elevator by other passengers when one passenger attempts to use a drag-type cart to carry laundry down a hall and into an elevator.

OBJECT OF THE PRESENT INVENTION

It is the principal object of the present invention to provide a wheeled device that can be used to tote laundry from an apartment by way of an elevator to another level of a high-rise dwelling without interfering with the use of the corridors and elevators by persons other than the manipulator of the hamper-cart device disclosed herein.

It is a further object of the present invention to provide a hamper-cart for laundry which is easily dismantable for storage in a small closet or the trunk of an automobile.

SUMMARY OF THE INVENTION

I have provided herein a laundry cart for use in high rise apartment dwellings and the like where elevating devices are available for human passengers and comprising; a first hamper means adapted to contain clothes and having a rigid base member to which is fixed wheel or caster means to allow free movement of the hamper in a horizontal plane. The first hamper has at least one vertical rigid wall thereon and the cart is provided with a plurality of additional hampers nestable one within the other and nestable into said first hamper. A vertically aligned socket is fixed to the wall of the first hamper and has a closed end fixed to the base member and an open end adjacent the top edge of the first hamper. A pole means is removeably and telescopically inserted into the socket and protrudes therefrom at least twice the depth of the hamper wall. A ring-type holder means is attached to the top side edge of each of the other hampers and are adapted to surround said pole in close engagement therewith when the pole is inserted therethrough prior to attachment into said socket.

The aforesaid objects will become apparent to those skilled in the relavent art from a reading of the following specification and the accompanying drawings of a preferred embodiment of the invention where like references numerals refer to like parts.

IN THE DRAWINGS

FIG. one shows a three tier set of hampers held to a pole-handle which sets into a socket fixed to the bottom hamper.

FIG. 2 shows the pole dismantled from its socket and the hampers nesting one within the other for storage or transport.

THE PREFERRED EMBODIMENT OF THE INVENTION

In the drawings numeral 10 designates a set of laundry hampers, 12,13,14, attachably mounted on a pole-handle means 15. The lower hamper or basket container 14 has a rigid bottom 16 to which are fixed wheels or casters 17 to permit horizontal movement of the cart combination 10 along a floor. A socket 18 having a closed end 21 attached to hamper bottom 16 and an open end 22 situate adjacent the edge 19 of hamper 14, is vertically inclined along the outside of a vertical wall 20 of the hamper 14. The pole 15 is removeably insertable in the socket 15 and can be held there by a pin means 9 manually pushed through an opening 24 in the top of the socket and an opening through the pole when the openings have been aligned to receive the pin.

The pole can be made telescopic to interfit down into the socket when not in use.

When the lower container or hamper is filled with clothes 30 the next adjacent hamper 13 will rest upon the clothes 30 in hamper 14 as shown. To insure that the upper hampers 13,12, do not topple over when the cart is trundelled down the corridor and into the elevator ring pole holders 27, 28, such as conventional snap rings, are provided at the top side edge of the hampers 13,12, respectively, to surround the pole-handle member when set into the socket. The pole thereby provides both the handle for manipulating and pushing the cart and a means for stabilizing the load of laundry hampers.

It is therefore, contemplated in operation of the cart that the stacked loaded hampers will be pushed or pulled along the hallways of the building by the efforts of a human being such as a housewife who could not otherwise manage to carry the hampers without assistance. Where the building is carpeted with pile rugs for silence purposes the wheels can be of the ball bearing caster type which can be pushed easily in spite of their small diameter. Since the pole remains upright when the cart is in use and being pushed down a corridor or into an elevator it will cause no inconvienience to other passengers on the elevators and will not prevent the entrance of the cart into narrow openings available in a crowd of passengers.

Figure 1:
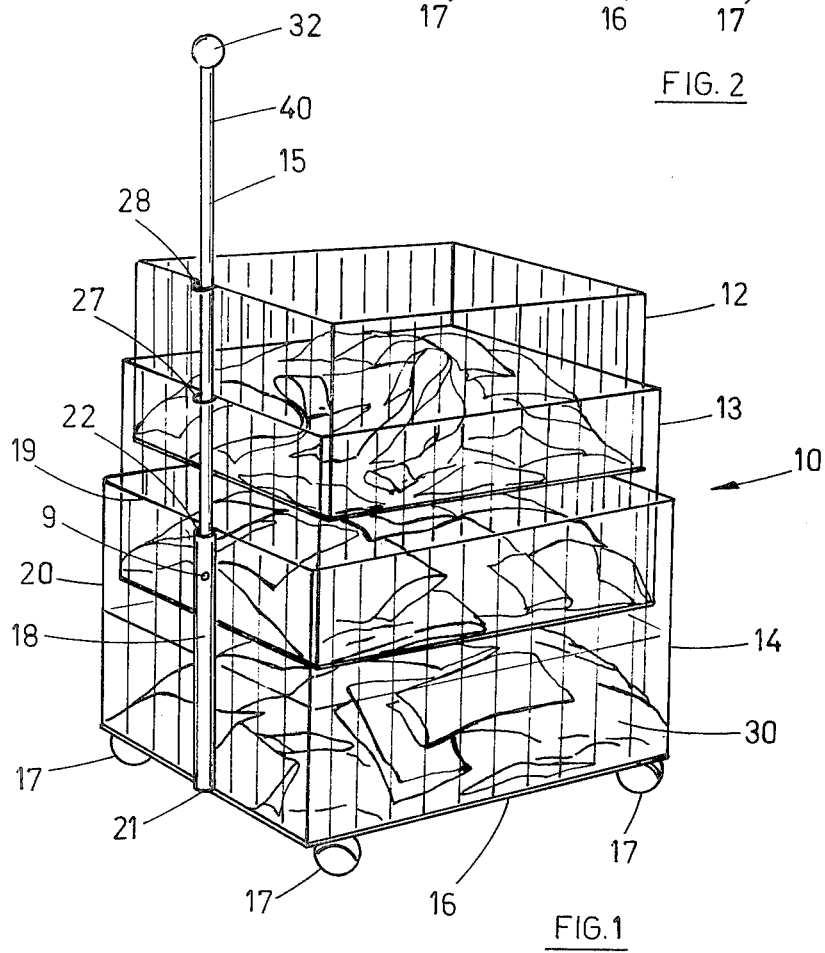

When the cart is not in use to carry the three loads of wash as depicted in FIG. 1 of the drawings, it can be easily dismantled by removing the pin 19 then removing the pole from the socket. The hampers when unhitched from the pole nest one within the other as in FIG. 2, and thus easily stored together at the foot of a closet or in an automobile trunk. The pole can stand by itself in a corner.

A simple grip means 32 can be provided the top end 40 of the pole to allow the pushing or pulling agency to grasp it when in use to cart a load of laundry.

It is understood that variations in the construction of the components of the cart hereinafter depicted and described can be made without departing from the scope of the invention as claimed.

What I claim is:

1. A laundry cart for trundelling onto the passenger elevators in multi-storey dwellings and having a pole-handle and a plurality of nesting hampers thereto each freely detachable from each other and the pole-handle and adapted to store separately upon dismantlement in a car trunk or dwelling closet, comprising in combination;

a first hamper means having a rigid base and at least one rigid side vertical wall thereto, and having a cylindrical socket holder having a closed lower end and an open upper end when vertically fixed to said rigid side wall thereof, said socket being fixed substantially midway of the length of said side wall;
   said pole-handle being at least twice the length of the depth of said side wall of said hamper and being removeably attachable in a vertical operative position in said socket which freely surrounds a portion of said pole-handle set therein;
   and at least one other hamper means nestable in said first hamper means and having a ring holder means fixed to and adjacent the upper side thereof and in a vertical line above the axis of said cylindrical socket to receive in freely surrounding relationship said pole-handle prior to the insertion of said pole-handle into said socket and while said socket maintains said handle in the vertical operative position for transfer of the force-push of a human agency to move the attached hampers; and wheel means attached to the bottom side of said first hamper.

2. A laundry cart as in claim 1, wherein said wheels comprise at least four spherical caster type wheels attached substantially at the outer edges of said first hamper and wherein said socket and said pole-handle have openings therethrough substantially adjacent their mating edges when the pole-handle is in operative vertical position in the socket, to receive a manually detachable pin.

* * * * *